United States Patent
Shinedling et al.

(10) Patent No.: US 9,944,335 B2
(45) Date of Patent: Apr. 17, 2018

(54) SINGLE FORM MULTI-AIRFOIL ELEMENT REAR AERODYNAMIC WING

(71) Applicants: Michael M. Shinedling, Oxford, MI (US); Sriram S. Pakkam, Royal Oak, MI (US); Arturo Guzman-Magana, Windsor (CA)

(72) Inventors: Michael M. Shinedling, Oxford, MI (US); Sriram S. Pakkam, Royal Oak, MI (US); Arturo Guzman-Magana, Windsor (CA)

(73) Assignee: FCA US LLC, Auburn Hills, MI (US)

( * ) Notice: Subject to any disclaimer, the term of this patent is extended or adjusted under 35 U.S.C. 154(b) by 6 days.

(21) Appl. No.: 15/097,882

(22) Filed: Apr. 13, 2016

(65) Prior Publication Data
US 2017/0297636 A1     Oct. 19, 2017

(51) Int. Cl.
  *B60J 9/00*      (2006.01)
  *B62D 35/00*   (2006.01)
  *B62D 29/04*   (2006.01)

(52) U.S. Cl.
  CPC ......... *B62D 35/007* (2013.01); *B62D 29/043* (2013.01)

(58) Field of Classification Search
  CPC ....... Y02E 10/70; Y02E 10/721; Y02T 50/12; Y02T 50/32; Y02T 50/166; Y02T 50/145; F03D 5/00; F03D 13/20; B62C 35/001
  USPC ..................................... 296/180.1
  See application file for complete search history.

(56) References Cited

U.S. PATENT DOCUMENTS

| | | | | |
|---|---|---|---|---|
| 3,455,594 A | * | 7/1969 | Mrlik | B60G 17/00 188/270 |
| 3,596,975 A | * | 8/1971 | Stephen | B62D 35/007 296/101 |
| 3,623,745 A | * | 11/1971 | Taylor | B60G 17/00 280/124.161 |
| 4,432,516 A | * | 2/1984 | Muscatell | B64C 3/48 244/113 |
| 4,558,898 A | * | 12/1985 | Deaver | B62D 35/007 264/251 |
| 4,629,240 A | * | 12/1986 | Dornier | B62D 35/007 180/903 |
| 4,652,036 A | * | 3/1987 | Okamoto | B62D 35/007 244/123.1 |
| 4,671,555 A | * | 6/1987 | Linz | B62D 35/007 296/180.5 |
| 4,688,840 A | * | 8/1987 | Kretschmer | B62D 35/007 296/180.1 |
| 4,743,057 A | * | 5/1988 | Loren | B62D 35/007 296/180.1 |
| 4,776,542 A | * | 10/1988 | Van Dam | B64C 3/10 244/198 |

(Continued)

FOREIGN PATENT DOCUMENTS

EP     2631160     8/2013

*Primary Examiner* — Kiran B Patel
(74) *Attorney, Agent, or Firm* — Ralph E Smith

(57) ABSTRACT

A multi-airfoil element wing includes a central single-airfoil element and an outer dual-airfoil element positioned outboard of each side of the central single-airfoil element. The single-piece member defines aerodynamic surfaces of the central airfoil element and both of the outer dual-airfoil elements. The single-piece member includes a carbon fiber resin hollow body forming at least a portion of the central single-airfoil element and of both outer dual-airfoil elements.

8 Claims, 5 Drawing Sheets

(56) References Cited

U.S. PATENT DOCUMENTS

| | | | | |
|---|---|---|---|---|
| 4,978,161 A * | 12/1990 | Schulze | B60J 7/106 | 29/401.1 |
| 5,013,081 A * | 5/1991 | Cronce | B62D 35/007 | 296/180.1 |
| 5,061,007 A * | 10/1991 | Simpson | B60G 21/05 | 180/903 |
| 5,106,147 A * | 4/1992 | Okada | B62D 35/007 | 296/180.1 |
| 5,678,884 A * | 10/1997 | Murkett | B62D 35/007 | 180/68.1 |
| 5,816,888 A * | 10/1998 | Myers | A63H 17/395 | 446/456 |
| 5,871,254 A * | 2/1999 | Burg | B62D 35/007 | 296/180.1 |
| 5,918,929 A * | 7/1999 | Vagis | B60R 9/04 | 296/180.1 |
| 5,924,763 A * | 7/1999 | Daniels | B62D 37/02 | 180/309 |
| 5,934,740 A * | 8/1999 | Moebius | B62D 35/007 | 296/180.1 |
| 6,183,041 B1 * | 2/2001 | Wilson | B60J 1/20 | 296/180.1 |
| 6,293,613 B1 * | 9/2001 | Choi | B62D 35/007 | 180/903 |
| 6,315,326 B1 * | 11/2001 | Muller | B60R 21/13 | 280/756 |
| 6,338,524 B1 * | 1/2002 | Wu | B62D 35/007 | 180/903 |
| 6,520,564 B1 * | 2/2003 | Liang | B62D 35/00 | 180/903 |
| 6,672,651 B1 * | 1/2004 | Shuen | B62D 35/007 | 296/180.1 |
| 7,036,871 B2 * | 5/2006 | Adams | B62D 35/007 | 180/903 |
| 7,121,917 B2 * | 10/2006 | Hardouin | A63H 17/045 | 446/270 |
| 7,220,032 B2 * | 5/2007 | Mori | B60Q 1/2615 | 296/180.1 |
| 7,252,324 B1 * | 8/2007 | Nahm | B29C 47/0023 | 244/123.1 |
| 7,322,638 B2 * | 1/2008 | Larson | B62D 35/007 | 180/903 |
| 7,438,347 B2 * | 10/2008 | Froeschle | B62D 35/007 | 180/903 |
| 8,113,470 B1 | 2/2012 | Motosko, III | | |
| 8,113,571 B2 * | 2/2012 | Goenueldinc | B62D 35/007 | 296/180.1 |
| 8,215,703 B2 * | 7/2012 | Goenueldinc | B62D 35/007 | 296/180.1 |
| 8,662,565 B2 * | 3/2014 | Jeffrey | B62D 35/00 | 296/180.1 |
| 8,678,475 B2 * | 3/2014 | Goenueldinc | B62D 35/007 | 296/180.5 |
| 8,740,285 B2 * | 6/2014 | Beckon | B60Q 1/2661 | 296/180.1 |
| 8,870,264 B2 * | 10/2014 | Hatzikakidis | B62D 37/02 | 296/180.1 |
| 8,944,491 B2 * | 2/2015 | Neumann | B62D 35/005 | 296/180.5 |
| 9,096,279 B2 * | 8/2015 | Beierl | B62D 35/007 | |
| 9,333,994 B1 * | 5/2016 | Fahland | B62D 35/007 | |
| 9,381,957 B1 * | 7/2016 | Auden | B62D 35/007 | |
| 9,403,564 B1 * | 8/2016 | Al-Huwaider | B62D 35/007 | |
| 2008/0111028 A1 * | 5/2008 | Kumar | B64D 15/14 | 244/134 D |
| 2008/0116717 A1 * | 5/2008 | Honeycutt | B62D 37/02 | 296/180.5 |
| 2008/0303227 A1 * | 12/2008 | Chi Chun Idiot | A63H 17/262 | 280/1 |
| 2013/0221701 A1 * | 8/2013 | De Luca | B62D 37/02 | 296/180.5 |
| 2013/0226414 A1 * | 8/2013 | De Luca | B62D 37/02 | 701/49 |
| 2013/0334838 A1 | 12/2013 | Jeffrey | | |
| 2017/0002904 A1 * | 1/2017 | Behle | F16H 7/02 | |

\* cited by examiner

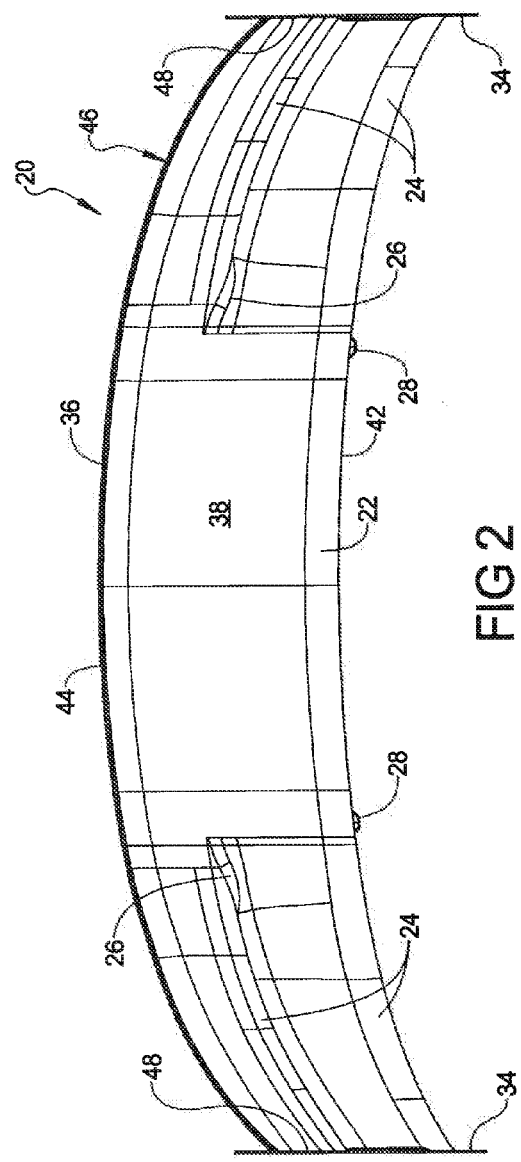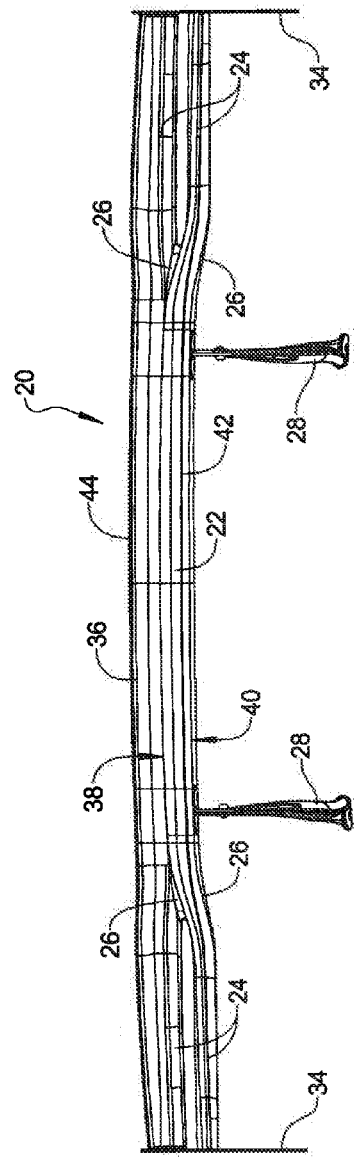

SINGLE FORM MULTI-AIRFOIL ELEMENT REAR AERODYNAMIC WING

FIELD

The present disclosure relates to rear aerodynamic wings or automobiles; and particularly to such wings having multiple airfoil elements.

BACKGROUND

High performance automobiles use aerodynamic elements to generate downward force (or downforce) on the vehicle to increase contact with the road, and provide increased stability and control. One of the most common aerodynamic elements for generating such downforce is a rear wing. A multitude of different criteria must be considered when designing a rear wing. These include downforce, drag, weight-to-strength ratio, performance at different speeds, performance during straightaways and curves, and visual aesthetics.

Rear wings that properly balance other considerations when the vehicle is traveling on a straightaway, too often suffer a precipitous loss of downforce when in yaw. Yaw is experienced, for example, when the vehicle is transitioning to, or when the vehicle is in, a cornering attitude. Yaw causes turbulence over the wing that reduces the downforce, resulting from a reduced aerodynamic effect of the airfoil element of the wing.

Similarly, rear wings that properly balance other considerations often require too much weight in order to provide the necessary strength (i.e., too high a weight-to-strength ratio). Spacing the wing sufficiently above a rear surface of the automobile is also desirable for minimizing turbulence over the airfoil surface of the wing. This further permits the rear surface itself to be shaped to have its own aerodynamic effect. As a result of mounting such a wing a distance above the rear surface of the vehicle, the additional weight resulting from the high weight-to-strength ratio effectively raises the center of gravity of the vehicle, creating its own potential stability and control negatives.

The visual aesthetics resulting from the combination of the wing with the automobile are also important. Indeed, improved visual aesthetics often improves the desired aerodynamic effect; i.e., downforce. This is because the aerodynamic effects of the wing will either fight against or work with the aerodynamic effects of the vehicle surfaces, just as the visual effects will either fight against or work with the vehicle surfaces.

SUMMARY

In an aspect of the present disclosure, a multi-airfoil element wing includes a central single-airfoil element and an outer dual-airfoil element positioned outboard of each side of the central single-airfoil element. The single-piece member defines aerodynamic surfaces of the central airfoil element and both of the outer dual-airfoil elements.

In aspects of the present disclosure, the single-piece member is an upper member that defines upper aerodynamic surfaces of the central airfoil element and both of the outer dual-airfoil elements. A lower single-piece member defines lower aerodynamic surfaces of the central airfoil element and both of the outer dual-airfoil elements joined to the upper single-piece member to form a hollow body. The single-piece member includes a carbon fiber resin hollow body forming at least a portion of the central single-airfoil element and both of the outer dual-airfoil elements.

In aspects of the present disclosure, the wing further includes a pair of stanchions for mounting the wing above a rear surface of an automobile. The central single-airfoil element spans fully between the stanchions, and the outer dual-airfoil elements are positioned and extend outboard of the stanchions.

In aspects of the present disclosure, the single-piece members include a smooth transition between the central single-airfoil element each of the dual-airfoil elements. The single-piece members include a concave leading edge and a convex terminating edge in top plan view. In top plan view, the single-piece member comprises a convex terminating edge and the wing is designed to provide aerodynamic down-force when mounted on an automobile having a convex terminating rear end. In side elevation view, the single-piece member comprises a rear upwardly curved shape and the wing is designed to provide aerodynamic down-force when mounted on an automobile having a rear upwardly curved shape

DRAWINGS

The present invention will become more fully understood from the detailed description and the accompanying drawings.

FIG. 2 is a top plan view of the exemplary wing of FIG. 1.

FIG. 3 is a front elevation view of the exemplary wing of FIG. 1.

DETAILED DESCRIPTION

Figure 1:
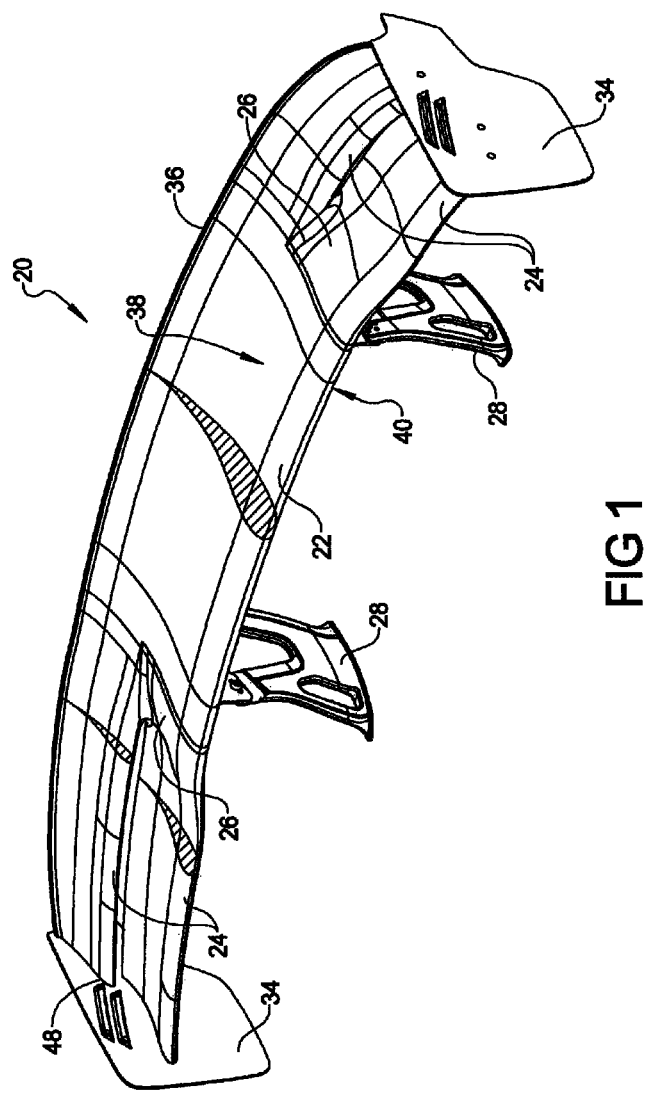
FIG. 1 is a perspective view of an exemplary embodiment of a single-piece multi-airfoil element rear aerodynamic wing in accordance with the present disclosure.
Figure 4:
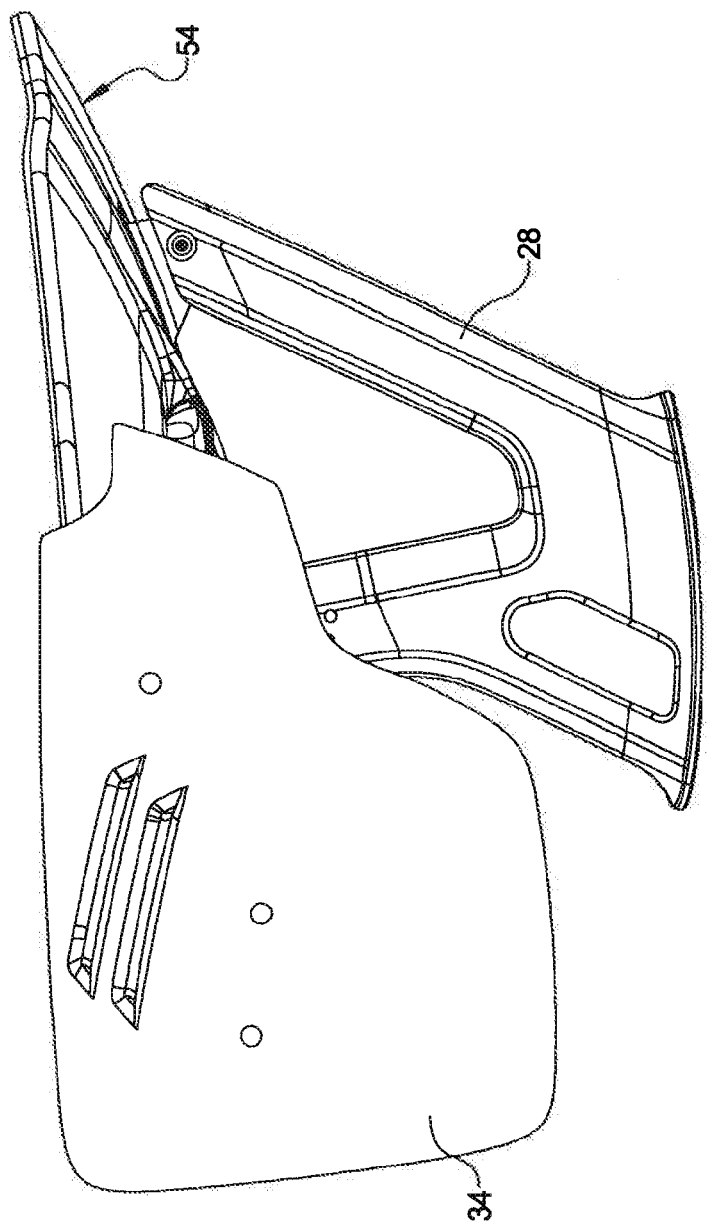
FIG. 4 is a side elevation view of the exemplary wing of FIG. 1.
Figure 5:
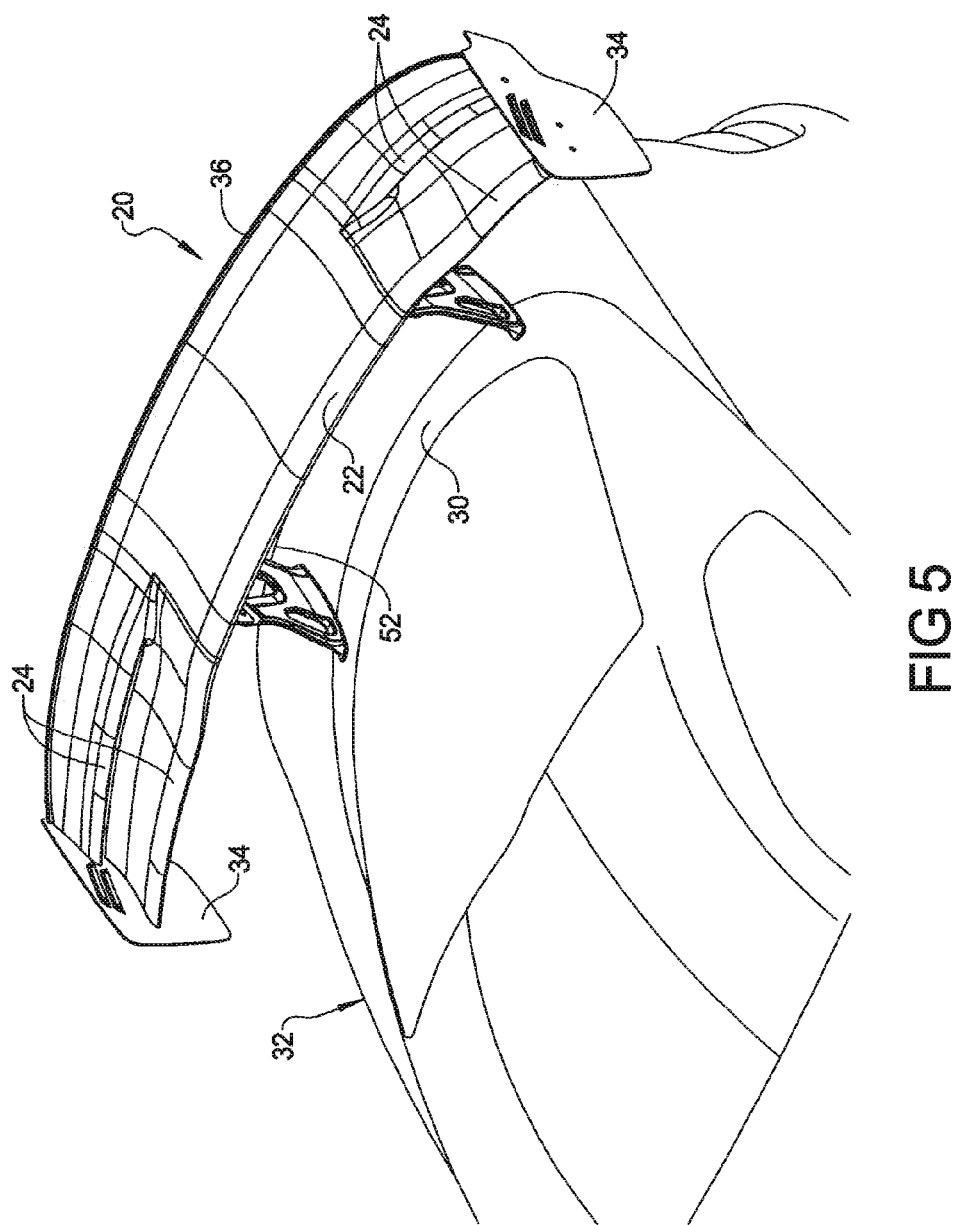
FIG. 5 is a partial perspective view of the exemplary wing of FIG. 1 mounted on an exemplary automobile for which the wing is designed.
Figure 6:
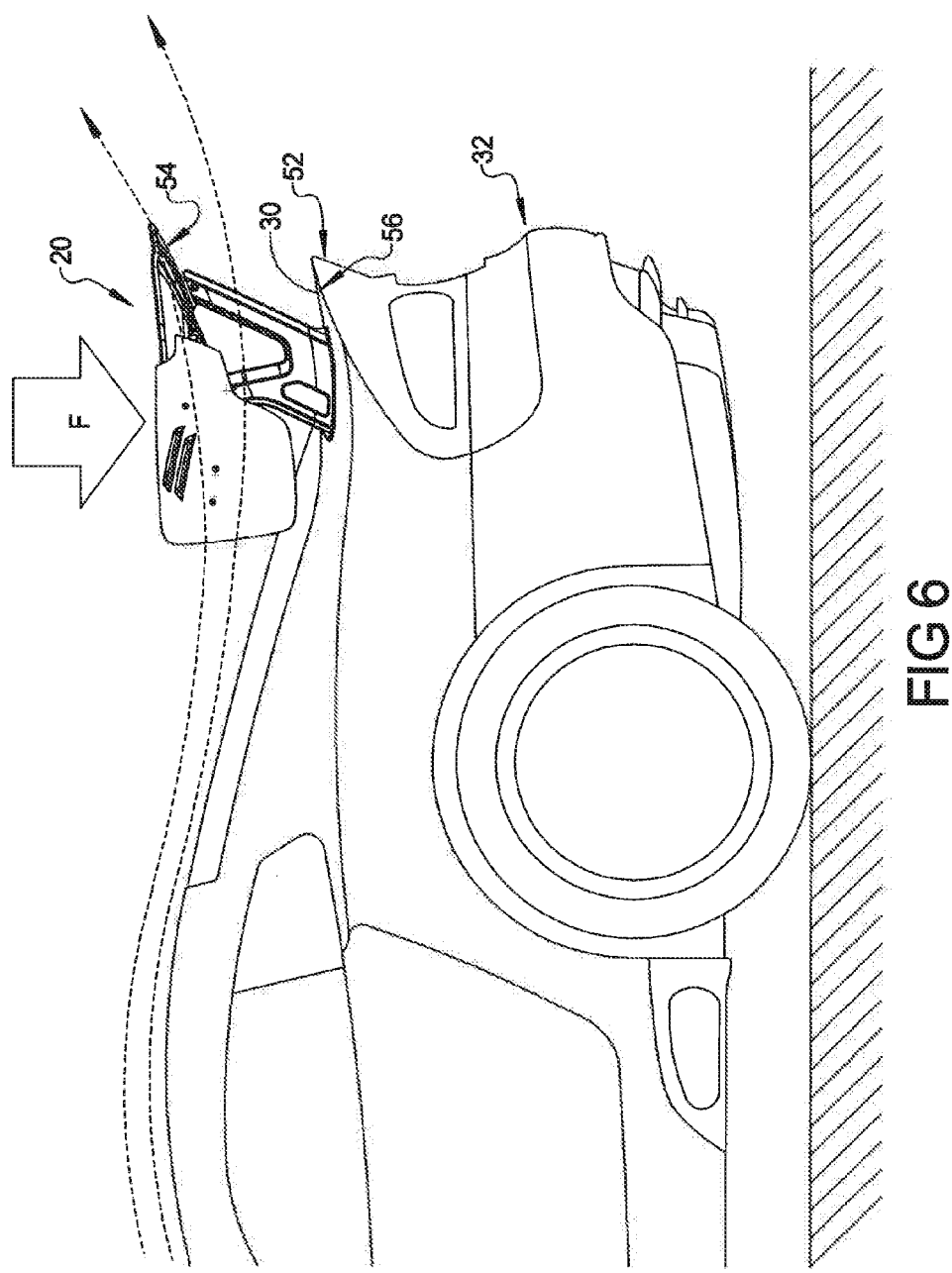
FIG. 6 is a partial side elevation view of the exemplary wing of FIG. 1 mounted on the exemplary automobile of FIG. 5.

Further areas of applicability will become apparent from the description, claims and drawings, wherein like reference numerals refer to like features throughout the several views of the drawings. It should be understood that the detailed description, including disclosed embodiments and drawings referenced therein are merely exemplary in nature, intended for purposes of illustration only, and are not intended to limit the scope of the present disclosure.

In the illustrated exemplary embodiment of FIGS. 1-6, a multi-airfoil element wing 20 includes a central single-airfoil element 22 positioned between two outer dual-airfoil elements 24. Thus, an outer dual-airfoil element 24 are positioned outboard of each side of the central single-airfoil element 22. Upper and lower outer transition surfaces 26 provide smooth transitions between the central airfoil element 22 and the outer dual-airfoil elements 24. A pair of stanchions 28 is coupled to the multi-airfoil element wing 20 for mounting the multi-airfoil elements 22, 24 above a rear surface 30 of an automobile 32.

In an aspect, the central single-airfoil element 22 spans completely between the stanchions 28, and the outer dual-airfoil elements 24 are positioned and extend outboard of the stanchions 28. In this example, the smooth transition surfaces 26 are also positioned outboard of the stanchions 28. End plates 34 are mounted to the outer dual-airfoil elements 24 at opposite distal side ends 48 of the wing 20. In this example, a vertical wicker lip 36 is provided along the trailing edge of the central airfoil element 22 and both of the outer dual-airfoil elements 24. The wicker lip 36 extends between the opposite distal side edges 48 of the wing 20 to which the end plates 34 are mounted.

In an aspect, when mounted on an automobile for which it was designed, and the vehicle is in yaw, such as when the vehicle is in a cornering attitude, the wing 20 does not experience a precipitous loss in downforce generation. This is believed to be due, in part, to the location of the dual-airfoil elements 24 laterally outside the central single-airfoil element 22 and adjacent the distal side edges 48 of the wing 20. This combination appears to position the smaller outer dual-airfoil elements 24 or aero foils in an area with less turbulent air in yaw, and positions the larger single-airfoil element 22 or aero foil centrally. Thus, when mounted on an automobile for which it was designed, this combination maintains its downforce in yaw better than full width single-airfoil spoilers, full width dual-airfoil spoilers, and wings with a central dual-airfoil element and outer single-airfoil elements.

In an aspect, an upper single-piece member 38 defines upper aerodynamic surfaces of each of the central airfoil element 22 and both of the outer dual-airfoil elements 24. A lower single-piece member 40 defines lower aerodynamic surfaces of each of the central airfoil element 22 and both of the outer dual-airfoil elements 24. Both the upper and lower single-piece members 38, 40 define these surfaces 38, 40 from the left distal side edge 48 to the opposite right distal side edge 48 of the wing 20. The lower single-piece member 40 and the upper single-piece member 38 are joined together along a leading edge part line 42 and a trailing edge part line 44. Thus, the lower single-piece member 40 and the upper single-piece member 38 are joined together to form a hollow body 46, including a hollow central airfoil element 22 and hollow outer dual-airfoil elements 24 on both sides of the central airfoil element 22. These hollow body elements are represented in FIG. 1 by the hatch-lined, aero foil shapes. Alternatively, just one single-piece member defines both upper and lower aerodynamic surfaces of each of the central airfoil element 22 and both of the outer dual-airfoil elements 24 to form such a hollow body 46. Reinforcements (not illustrated) are provided for mounting the stanchions 28 and end plates 34 to the hollow body.

In an aspect, the single-piece member or members are made of a carbon fiber resin material. Such a combination of one-piece member(s) 38, 40 spanning and defining the airfoil surfaces elements 22, 24 formed of a hollow body 46 of carbon fiber resin material in the illustrated embodiment provides a very desirable weight-to-strength ratio. Such ratios enable the wing 20 to generate substantial downforce without negatively affecting the center of gravity of the automobile.

In an aspect, multi-airfoil element components and the single-piece members 38, 40 exhibit a concave leading edge 42 and a convex trailing edge 44 in top plan view (e.g. FIG. 2). It is believed these leading and trailing edge shapes also affect the maintenance of downforce when in yaw. In an aspect, the wing 20 is designed to provide aerodynamic down-force when mounted on an automobile that also has convex terminating rear end 52 in top plan view. In an aspect, the single-piece members 38, 40 include an upwardly curved rear shape 54 and the wing 20 is designed to provide aerodynamic down-force when mounted on an automobile that also has an upwardly curved rear shape 56. Thus, in addition to providing favorable aerodynamic effects, the visual aesthetics also provide favorable visual effects.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A multi-airfoil element wing comprising:
   a central single-airfoil element;
   an outer dual-airfoil element positioned outboard of each side of the central single-airfoil element;
   wherein a single-piece member defines aerodynamic surfaces of the central single-airfoil element and both of the outer dual-airfoil elements.

2. The multi-airfoil element wing of claim 1, wherein the single-piece member is an upper member that defines upper aerodynamic surfaces of the central single-airfoil element and both of the outer dual-airfoil elements, and further comprising a lower single-piece member that defines lower aerodynamic surfaces of the central single-airfoil element and both of the outer dual-airfoil elements joined to the upper single-piece member to form a hollow body.

3. The multi-airfoil element wing of claim 1, wherein the single-piece member comprises a carbon fiber resin hollow body forming at least a portion of the central single-airfoil element and of both outer dual-airfoil elements.

4. The multi-airfoil element wing of claim 1, further comprising a pair of stanchions for mounting the wing above a rear surface of an automobile, wherein the central single-airfoil element spans fully between the stanchions, and the outer dual-airfoil elements are positioned and extend outboard of the stanchions.

5. The multi-airfoil element wing of claim 4, further comprising a smooth transition between the central single-airfoil element each of the dual-airfoil elements.

6. The multi-airfoil element wing of claim 1, wherein the single-piece member comprises a concave leading edge and a convex terminating edge in top plan view.

7. The multi-airfoil element wing of claim 1, wherein, in top plan view, the single-piece member comprises a convex terminating edge and the wing is designed to provide aerodynamic down-force when mounted on an automobile having a convex terminating rear end in top plan view.

8. The multi-airfoil element wing of claim 1, wherein, in side elevation view, the single-piece member comprises a rear upwardly curved shape and the wing is designed to provide aerodynamic down-force when mounted on an automobile having a rear upwardly curved shape in side elevation view.

\* \* \* \* \*